3,189,514
COMPOSITE BOARD
Ellsworth H. Shriver and Stanley E. Knowles, Chillicothe, Ohio, assignors to The Mead Corporation, Dayton, Ohio, a corporation of Ohio
Filed June 15, 1959, Ser. No. 820,355
9 Claims. (Cl. 161—250)

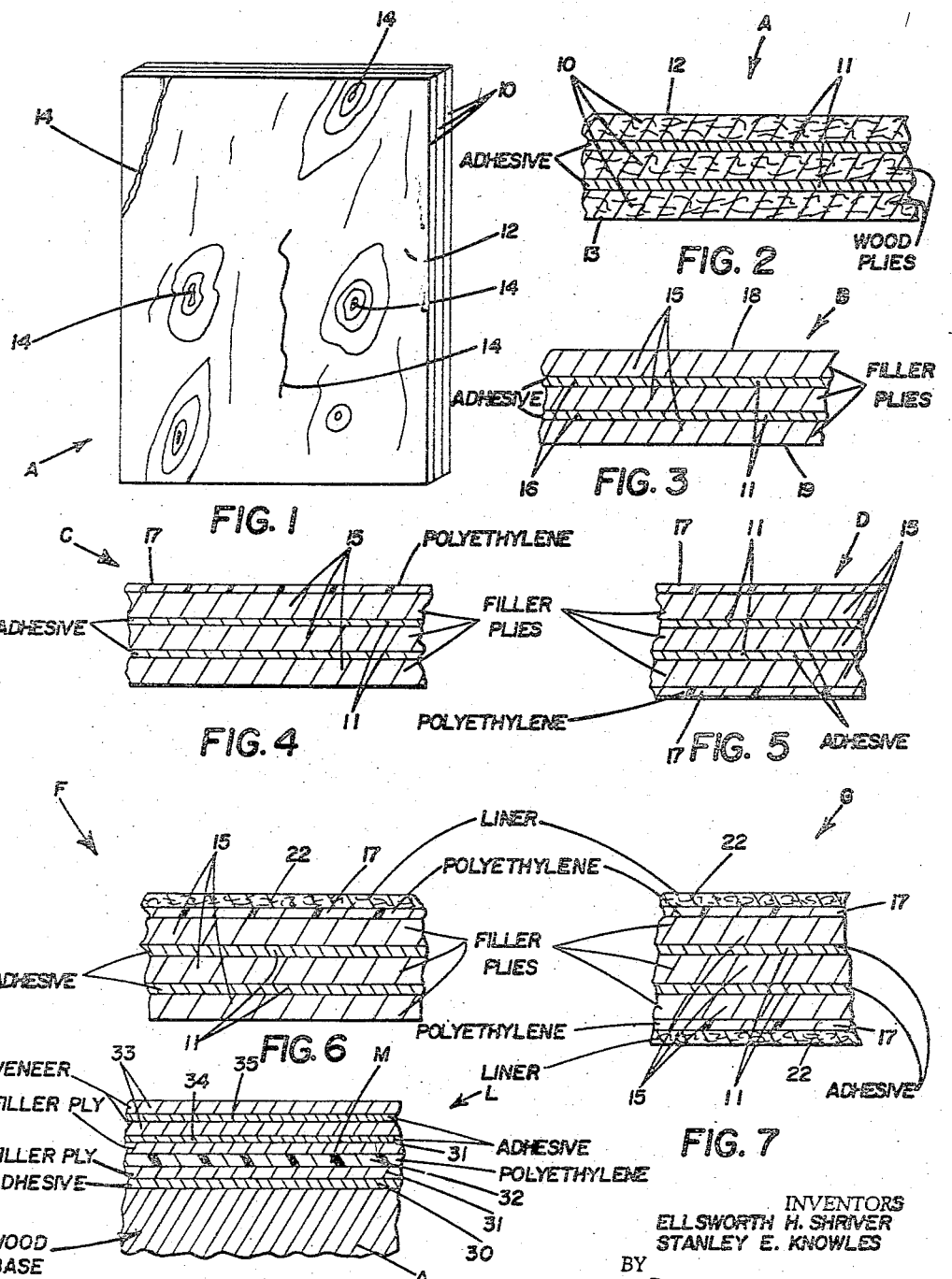

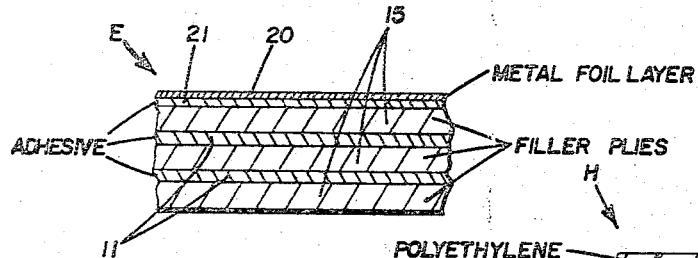
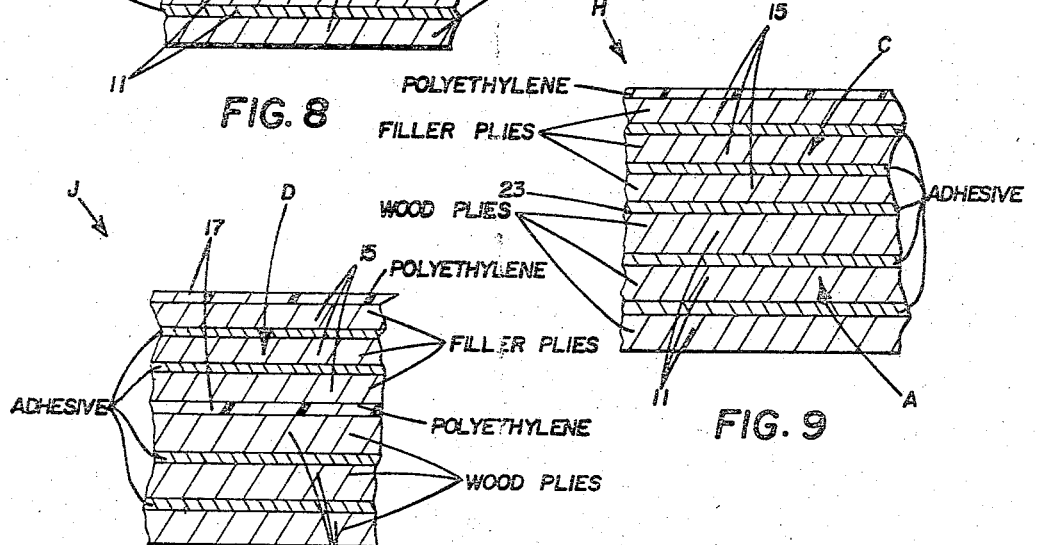
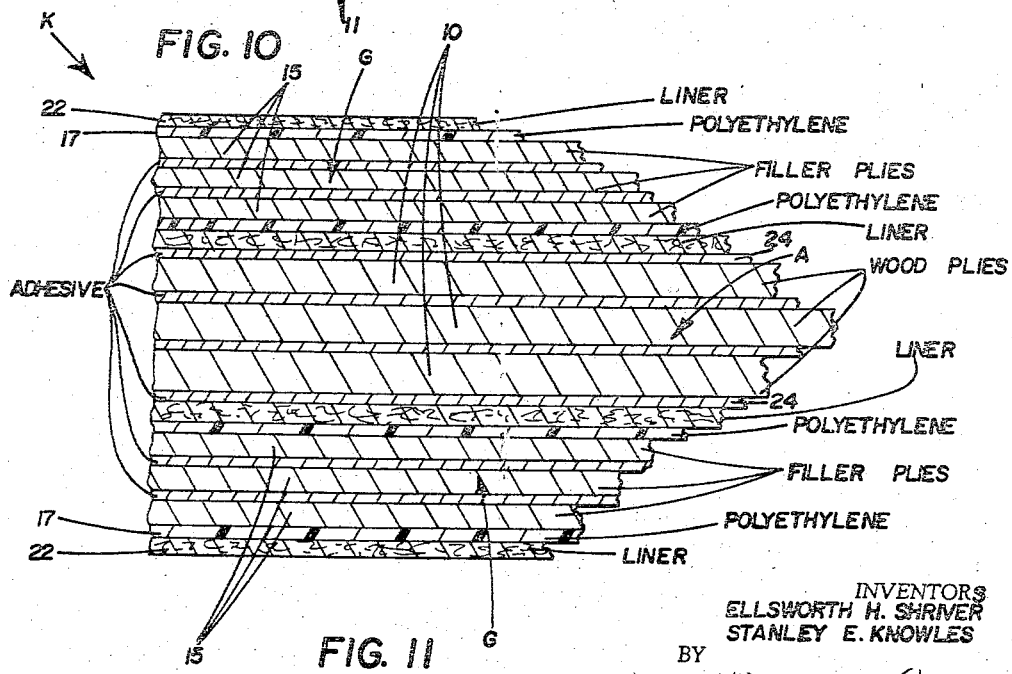

This invention relates to an improved decorative or decoratable and/or structural panel and to the method of producing the same. In particular, this invention relates to an improved laminated panel having a wood base formed of one or more wood plies and a dimensionally stable composite board secured to at least one of the opposed surfaces of the wood base, and to the method of producing such an improved panel.

One of the principal objects of the present invention is to provide an improved laminated panel suitable for building purposes and the like and having an unusually low moisture vapor and water sorption characteristics, and to provide a method for producing such a panel.

Another object of this invention is to provide an improved laminated panel which retains high dimensional stability during long periods of use under varied conditions of humidity without objectionable warping, buckling, checking and the like, and to provide a method for producing the same.

The building industry, as well as other types of businesses, have been utilizing conventional plywood panels in greater quantities and for an increasing number of uses than in the past because of the strength, durability, and ease of installation of such panels in building and packaging applications or the like. Such plywood panels each normally comprise a plurality of flat sheets of wood veneer secured together by a suitable adhesive, such as glue and the like, to form a laminated structure, the grains of the adjacent sheets being substantially disposed at right angles relative to each other to form a relatively rigid panel. However, it has been found that such plywood panels have certain limitations and disadvantages despite the increasing use of the same.

In particular, one disadvantage of a conventional plywood or single-ply veneer panel is that the exposed surfaces thereof are subject to "face-checking," i.e., the grain of the surfaces tends to rise because of subsequent shrinkage and/or relief of stresses in the panel and thus opens small cracks and produces noticeable roughness in the surfaces of the panel. Various mechanical and chemical methods have been provided to minimize such "face-checking." However, such methods are relatively costly.

Another disadvantage of a conventional plywood or single-ply veneer panel is the lack of dimensional stability. It is well known that wood tends to absorb moisture in an amount dependent upon the humidity of the air surrounding the panel. As moisture is absorbed in the panel, the wood tends to swell. Uneven gain or loss of the moisture throughout the panel results in warpage of the panel. Further, rapid changes in the moisture content of one or more of the plies of a plywood panel or on opposite sides of a single-ply veneer panel, causes a more severe permanent warpage than do slow changes in the moisture content. Although thin plywood or veneer panels tend to warp to a greater degree than thick panels, the thicker warped panels provide a greater resistance to a subsequent straightening operation than provided by the thinner warped panels.

Further, imperfections in the exposed surface or surfaces of a plywood or single-ply veneer panel, such as cracks, knots, objectionable grain, and the like, render such panels less desirable for finished work.

It is well known that various grades of plywood or single-ply veneer panels are made, the better and more costly grades having exposed surfaces relatively free of cracks, knots, and other imperfections, such imperfections frequently being covered by wood plugs and the like, whereas the lesser and cheaper grades have a greater number of imperfections in the exposed surfaces thereof. Such surfaces are relatively difficult to decorate, such as by painting and the like, because the same tends to absorb the paint and thus require several coats of paint to effectively color such imperfections.

Still another disadvantage of such conventional wood panels is that the greatest quantity of wood panels are made from the more available Douglas fir materials. Such Douglas fir panels have relatively soft surfaces that are easily marred in shipping and installation and which are easily split by nails, screws, or other fastening means driven near the edges thereof. Further, sawing of such panels often causes splintering of the same.

Therefore, certain panel manufacturers have been applying a composite board to one or both opposed surfaces of a wood base or core structure in order to tend to retard moisture and vapor transmission into and out of the wood structure of the panel, the wood base comprising one or more sheets or plies of wood secured together in the same manner as conventional plywood. The composite board normally comprises one or more sheets of paper and the like and provides an outer surface for the panel that is relatively smooth and that has visual appeal, the outer surface also being readily painted and the like for decorating purposes.

However, it has been found that although such prior known laminated structures tend to retard moisture and vapor transmission, the composite structure does not reduce "face-checking" to a desirable degree and does not provide additional structural stability to the wood base. Therefore, in order to provide an improved laminated structure having substantially the same structural characteristics as a comparable, conventional plywood panel, the prior known types of laminated panel must each comprise the same number of plies of wood as the respective plywood panel and include, in addition, one or more composite boards. This, of course, results in a more expensive panel, although the panel is more desirable for certain purposes.

It has been found, however, according to the teachings of this invention, that a dimensionably stable composite board can be provided which, when secured to one or both opposed surfaces of a plywood or single-ply veneer panel, will eliminate or minimize all or part of the major disadvantages of the conventional panel as set forth above, as well as add structural stability to the wood panel. Such a composite board provides a smooth, uniform, and continuous exposed surface for the panel and completely eliminates "face-checking," as the composite board lies perfectly flat against the wood structure without any natural stresses tending to bow the same.

The composite board of the invention includes one or more water and water vapor barrier films or layers which will substantially decelerate the rate of moisture and moisture vapor transmission in and out of the wood structure of the panel to an extent the change in the moisture content of the wood structure resulting from day-to-day or week-to-week changes in the humidity of the surrounding air will not adversely affect the improved panel. That is, since it is well known that warpage of plywood or single-ply veneer panels is most severe and permanent when one ply or one side dries more rapidly than the other plies or other side thereof because of the different environments or nature of the wood, the barrier film or films of the composite board are so constructed and arranged that the same retards the passage of moisture in and out of the wood structure of the panel to such an extent that the moisture content throughout the entire wood structure is equalized over a long period of time. In this manner, the improved laminated panel is not adversely affected by each short cycle of change in the relative humidity of the surrounding air.

It has been found that the composite board of this invention effectively covers up the imperfections in the wood base whereby a cheaper grade of plies or veneers of wood can be utilized, the cheaper grades being structurally the same as the more expensive grades. Therefore, an improved laminated panel can be provided by this invention having certain advantages over and eliminating certain disadvantages of a comparable, more expensive conventional plywood or veneer panel. It has also been found that the composite board of this invention renders the outer surface of the laminated panel very resistant to the deep penetration of paint and the like because of the barrier film or layer thereof. Therefore, the composite board imparts improved paintability to the surface of the panel.

Therefore, it is another object of the present invention to provide an improved laminated panel having a wood base and a composite board secured to at least one of the surfaces of the wood base, the composite board adding structural stability to the wood base, and to provide a method for producing such an improved panel.

A further object of this invention is to provide an improved laminated panel having a wood base and a composite board secured to at least one of the surfaces of the wood base, the composite board retarding moisture and vapor transmission into and out of the panel, and to provide a method for producing such an improved panel.

Another object of this invention is to provide an improved laminated panel having a wood base and a composite board secured to at least one of the opposed surfaces of the wood base, the composite board imparting improved decorative or decoratable qualities to the wood base.

A further object of this invention is to provide an improved laminated panel having a wood base and a composite board secured to at least one of the opposed surfaces of the wood base, the composite board substantially eliminating the disadvantages of "face-checking" and/or imperfections in the wood base whereby lower and less expensive grades of wood can be utilized if desired.

Other objects, advantages and uses of this invention will become apparent upon a reading of the following specification, taken in conjunction with the accompanying drawings forming a part thereof and wherein:

FIGURE 1 is a perspective view of a wood base structure;

FIGURE 2 is an enlarged fragmentary cross-sectional view of the wood base structure of FIGURE 1;

FIGURE 3 is a fragmentary enlarged cross-sectional view of the composite board illustrating part of this invention;

FIGURE 4 is a view similar to FIGURE 3 and illustrates one form of a composite board;

FIGURE 5 is a view similar to FIGURE 4 illustrating another form of a composite board;

FIGURE 6 is a fragmentary enlarged cross-sectional view illustrating still another form of a composite board;

FIGURE 7 is a view similar to FIGURE 6 and illustrates another form of a composite board;

FIGURE 8 is a fragmentary enlarged cross-sectional view of still another form of a composite board;

FIGURE 9 is a fragmentary enlarged cross-sectional view illustrating the composite board of FIGURE 4 secured to the plywood base structure of FIGURES 1 and 2;

FIGURE 10 is a view similar to FIGURE 9 and illustrates the composite board of FIGURE 5 secured to the plywood base structure of FIGURES 1 and 2;

FIGURE 11 is an enlarged fragmentary cross-sectional view and illustrates a composite board of FIGURE 7 secured to each opposed surface of the wood base structure of FIGURES 1 and 2; and, FIGURE 12 is an enlarged fragmentary cross-sectional view and illustrates another embodiment of this invention.

Reference is now made to the accompanying drawings wherein like reference numerals and letters are used throughout the various figures thereof to designate like parts where appropriate, and particular reference is made to FIGURES 1 and 2 illustrating a conventional plywood base structure generally indicated by the reference letter A and comprising a plurality of wood plies or veneers 10 respectively secured together in a laminated structure by interposed adhesive layers or films 11, the adhesive material being, for example, glue or the like. Although the wood base structure A is illustrated as being formed from three wood plies 10, it is to be understood that one or more plies 10 can be utilized to form the wood base structure A, the number of plies 10 normally being determined by the particular structural characteristics and/or thickness desired. Further, the particular cross-sectional thickness of each ply 10 may be equal to or different from the cross-sectional thickness of one or more of the other plies 10, the particular thicknesses being merely a structural design characteristic.

Also, it is to be understood that the wood base structure A may be formed from a single or a plurality of plies of hardboard, particle board, or the like, rather than the conventional plywood structure as set forth above. Therefore, the terms "wood base structures," as used throughout this application and in the appended claims are intended to include structures formed at least partially from wood, wood fibers, or the like.

The laminated wood base structure A has a pair of opposed surfaces 12 and 13. As previously stated, the exposed surfaces of a plywood or single-ply veneer panel normally contain various undesirable imperfections such as knots, cracks, splits, open crevasses, objectionable grain and the like in the manner shown at 14 on the exposed surface 12 of the structure A illustrated in FIGURE 1.

As previously stated, the finer and more costly grades of wood plies have fewer objectionable imperfections than the poorer and less expensive grades of wood. However, the relative costs and substantially diminishing supply of the finer grades of wood creates a situation where it is not economically feasible to utilize such grades of wood for all the purposes where a structural and decorative panel are required. This invention, however, is readily applicable to wood base structures formed from the poorer grades of wood as well as the finer grades of wood and thus permits the up-grading of the surfaces of the poorer grades of wood to a surface equal to or better than the finer grades of wood while not appreciably adding to the cost thereof. Further, only the larger openings in the surface of poorer grades of wood need be filled with wood, paper or suitable paste preparations.

Therefore, according to the teachings of this invention, a composite board has been provided which, when secured to the surface 12 or 13 or both surfaces 12 and 13 in a manner later described, effectively covers up such imperfections 14, adds structural stability to the wood base structure A, renders the same substantially free from warping, buckling, peeling and the like, renders the wood base structure decorative or decoratable, and provides further advantages and features such as are previously set forth and hereinafter shown or described. Some of the types of the composite board of this invention are set forth in the United States patent to Jenk et al., No. 2,774,698.

As shown in FIGURES 4 to 8, various composite boards are formed in accordance with this invention and each comprises a laminated structure B as illustrated in FIGURE 3. In particular, the laminated structure B comprises a plurality of board filler sheets or elements 15 respectively secured together by suitable layers or films 16 of adhesive material or substance interposed respectively between adjacent board filler elements 15.

Each board filler sheet or element 15 may for example comprise a single ply fiberboard produced on a conventional board forming machine from a pulp furnish of 85% old boxes and 15% semi-chemical chestnut pulp with 3% beater starch added based on total pulp. Each board filler element 15 is impregnated with a sizing, such as rosin size, intimately incorporated in the fibers thereof. The beater starch, as it occurs in the filler element 15, is of a slightly water-receptive character, and in addition to acting as a binding for holding the fibers together, functions as a moisture retentive agent for maintaining small amounts of moisture in the filler element 15. The rosin size as used provides the filler sheet or element 15 impervious or substantially water repellent and is generally of a proportion to give a lactic acid size test on board of from two to ten minutes and preferably from five to seven minutes. Such lactic acid size test essentially consists of measuring the average time in minutes for the adsorption of the first five of ten drops of 50% by weight lactic acid into the surface of the filler element 15 when applied to the board filler element 15 from an eye dropper. In this test, a 50% aqueous solution of lactic acid is used instead of water since the adsorption of water is so slow that the drops applied to the surface evaporate before they penetrate, whereas such 50% lactic acid shows a reasonable penetration time and is therefore more convenient and reliable. Filler sheets such as those produced from a furnish of waste paper consisting of 47% kraft cuttings, 47% old boxes and 6% broke and other pulp furnishes may also be used for producing the board filler elements 15.

To render the structure B of board filler elements 15 resistant to water when it is desired to provide a structure of several plies as shown in FIGURE 3, the board filler elements 15 are adhesively united with an adhesive material or substance 16 which, upon drying, becomes insoluble with water. The substance 16 lightly impregnates and adhesively unites the board filler elements 15 and preferably consists of a resin type adhesive which, upon being applied to a suitable surface, first sets to a partially dried water receptive state and then to a fully dried water insoluble state and does not lose its adhesive strength when exposed to water during conditions of use.

Examples of such adhesive materials are starches modified with water dispersed urea formaldehyde resins, phenolic glues, polyvinyl adhesives such as Du Pont No. 78, aqueous dispersions of proteins, as for example, soya protein and casein, and other water insoluble adhesive materials of this general character.

In applying the adhesive material 16 to the board filler elements 15, the rosin sizing provided therein serves a further useful purpose in preventing excess impregnation of the board filler elements 15 by the resin adhesive, thus assuring high bonding efficiency. Adequate amounts of the resin type adhesive material 16 are applied to the surface of the board filler elements 15, however, sufficient to render the board filler elements 15 capable of withstanding exposure to water such as occurs during development and use of the improved panel of this invention, without significant stretching or shrinking or ply separation occurring. For most operations, it has been found that the amount of adhesive used for satisfactorily joining the filler board elements 15 together is of the order of two pounds per thousand square feet for each such adhesive glue line.

Although the laminated structure B is illustrated as being formed from three board filler elements 15, it is to be understood that one or more board filler elements 15 may be utilized to form the various composite boards of this invention and hereinafter described.

As shown in FIGURES 4 and 5, a water and water vapor proof continuous barrier film or layer 17 is disposed over one or both exposed surfaces 18 and 19 of the assembled board filler elements 15. As shown in FIGURE 4, the composite board, generally indicated by the reference letter C, has only the outer surface thereof provided with the barrier film or layer 17. The composite board illustrated in FIGURE 5 and generally indicated by the reference letter D has a pair of barrier films or layers 17 disposed respectively over the exposed surfaces 18 and 19 thereof.

One example of such a water and water proof continuous barrier film or layer 17 utilized is a continuous film of polyethylene resin, such resin being readily available on the market.

One example of the amount of such a barrier film 17 utilized in the formation of the composite boards C or D of the present invention which has been found commercially suitable was of the order of four to five pounds per thousand square feet of surface for each side of the composite board.

A completed composite board that has been found effective for the particular use thereof comprised three plies of board filler elements of 0.020 inch thickness, a polyethylene film of 0.001 inch thickness, and a kraft paper liner of 0.003 inch thickness.

It has been found that other water and water vapor proof materials, as for example, metal foils, chlorinated rubbers, polypropylene, polyvinyl compounds and nitro and ethyl cellulose compounds may also be utilized to form such a continuous barrier film or layer 17 provided that they are sufficiently water and water vapor proof so as to effectively limit or prevent the diffusion of liquid water or water vapor from the surface of the composite board into the board filler elements 15. Further, such a barrier in accordance with this invention is sufficiently resistant to heat so as to retain the aforementioned functions at the highest temperature the composite board may be subjected to during conditions of use.

One example of a composite board having a metal barrier is illustrated in FIGURE 8. In particular, the composite board, an assembled laminated structure B of board filler elements 15 and a sheet 20 of aluminum foil or other metal secured to the exposed surface 18 of the board filler structure B by an interposed adhesive layer or film 21. The sheet 20 provides a weatherproof surface and a moisture barrier for the composite board E.

Two other forms of composite boards, generally indicated by the reference letters F and G, are respectively illustrated in FIGURES 6 and 7. The composite board F comprises a plurality of board filler elements 15 and a single barrier film 17 secured together in the same manner as the composite board C illustrated in FIGURE 4. In addition, a protective covering or liner 22, such as paper or the like is adhesively united to the exposed barrier film 17 of the board F. If desired, the liner 22 may be secured to the barrier film 17 by a suitable adhesive layer (not shown) or the water and water vapor barrier film or layer 17 may function as the adhesive as illustrated in FIGURE 6. Similarly, the composite board G illustrated in FIGURE 7 comprises a plurality of board filler elements 15 and a pair of opposed barrier films 17 secured together in the same manner as the composite board D illustrated in FIGURE 5. In addition, a liner 22 is secured to the exposed surfaces of each barrier film 17 in the same manner as the liner 22 illustrated in FIGURE 6.

Various types of liners 22 that have been found suitable for the intended use in composite boards are for example, a paper liner of bleached sulphite or bleached kraft referred to in the trade as 26 lb. waxing paper, and a paper liner consisting of 54% bleached sulphite, 36% bleached sulphate, and 10% broke which was made to a basis weight of 26 lbs. per ream (24×36—500 sheets). Further, the liner 22 may be white paper, brown paper, or printed and embossed decorated paper. If desired, the liner 22 may be additionally covered with paint, fabric, floc, tufts, upholstery materials, weather resistant materials, plastic film, plastic foam, metal foils, and the like for decorative and other purposes. Various decorative designs can be utilized in painting or coating the paper liner, such designs may include wood grain, brick, masonry, log, cedar shingle, and other exterior patterns. Further, the paper liner and/or its covering material may be embossed in striated and other patterns to provide a pleasing effect.

When the paper liner 22 is painted or coated with other materials, the barrier film 17 disposed adjacent thereto prevents excessive absorption of the paint or other coating by the composite board and, therefore, imparts an improved paintability quality to the composite board.

As previously stated, the various composite boards of this invention are utilized to improve the qualities of plywood or single-ply veneer panels when secured thereto in the manner set forth hereinafter.

In particular, reference is made to FIGURE 9 illustrating an improved laminated panel generally indicated by the reference letter H and comprising a wood base structure A of FIGURE 2 and a composite board C of FIGURE 4 secured to the surface 12 of the wood base structure A by an interposed adhesive layer 23. If desired, the adhesive layer 23 may double as a second water and water vapor barrier film and may comprise an epoxy resin or similar adhesive.

As previously stated, the composite board of this invention permits the up-grading of the surfaces of a wood base structure equal to or better than the finer grades of wood. In particular, if the wood base structure A has surface defects on the order of open knotholes of 2½ inches maximum diameter, splits of ⅛ inch for ¼ of the length of the panel, the composite boards of this invention will effectively bridge such imperfections. Further, certain grades of wood have knots of 6 inches diameter and, therefore, cannot be presently used in panel structures. However, by filling the larger holes with paste, wood, or paper to maintain ply strength, even this grade of wood can be effectively utilized with this invention. The lower limit on the size of holes which must be filled will depend upon the particular thickness of the composite board utilized.

While the improved panel H has been described as having a composite board C secured to the exposed surface 12 of the wood base structure A, it is to be understood that the composite boards D, E, F, and G or any other type of composite board, covering, or the like may be secured to the other exposed surface 13 of the wood base structure A, the feature of this invention being deemed essential is that at least one composite board formed in accordance with this invention be secured to a wood base structure.

As shown in FIGURE 10, another improved laminated panel is formed in accordance with the teachings of this invention and is generally indicated by the reference letter J. The laminated panel J comprises a composite board D of FIGURE 5 adhesively secured to the exposed surface 12 of the wood base structure A of FIGURE 2. In the embodiment illustrated in FIGURE 10, the composite board D is adhesively secured to the wood base structure A by the barrier film 17. However, if desired the composite board D may be secured to the base A by an interposed adhesive layer in a manner similar to the panel H previously described. Further, the other exposed surface 13 of the wood base structure A may receive any one of the composite boards C–G or other covering as desired.

An improved laminated panel K is illustrated in FIGURE 11 and comprises a wood base structure A of FIGURE 2 and a pair of composite boards G of FIGURE 7 secured respectively to the exposed surfaces 12 and 13 of the base A by a respective interposed layer 24. Since a barrier film 17 is disposed adjacent the liner 22 of each board G which is secured to the base A by the adhesive layer 24, the inner barrier film 17 prevents excessive adhesive strike-in and thus permits a satisfactory bond with less material. Similarly, the outer barrier film 17 of each board G prevents excessive strike-in of paint, adhesive, or other coatings applied to the outer liner 22 thereof.

While the improved panel K of FIGURE 11 has a composite board G secured to each exposed surface of the wood base structure A, it is to be understood that any combination of coverings could be applied to the base A as long as one of the coverings comprises a composite board of this invention.

As previously stated, not only do the composite boards of this invention have the economic advantage of upgrading cheaper quality plywood or single-ply veneer panels to a structure having certain advantages over the finer grades of wood panels, but they also provide the further economic advantage of adding structural qualities and thickness to the wood base structure. For example, if it is desired to up-grade both surfaces of ¼ inch plywood or single-ply veneer, a pair of composite boards each having a ⅛ inch thickness will provide an improved panel having a ½ inch thickness at a lower cost than conventional wood panels having a ½ inch thickness. The improved panel also has advantages not provided by the conventional wood panel.

If it is desired to further weather proof such improved panels, the composite boards of this invention can be densified under the pressure of rolls or platens to present a tough, hard, weather and wear resistant surface.

Another improved laminated panel of this invention is illustrated in FIGURE 12, the panel being indicated generally by the reference letter L. The panel L comprises a wood base structure A having a composite board M secured to the upper surface thereof by a suitable layer of adhesive 30. The composite board M includes a pair of filler plies or paper liners 31 secured together by an interposed layer of polyethylene 32. The outer ply 31 may be covered with any suitable material, if desired, and in the embodiment illustrated, a plurality of high grade crossband wood veneers 33 are secured to the outer ply 31 by an interposed layer of adhesive 34, the veneers 33 being secured together by an adhesive layer or film 35. The resulting panel structure L is suitable for producing furniture and the like, the composition board M stabilizing the wood base structure A in the manner set forth above and, therefore, stabilizing the entire panel structure L.

It is to be understood that the other side of the wood base structure A of the panel L could be laminated with a similar composite board as set forth above or with any other type of covering if desired.

While the composite boards of this invention have been described as being utilized with conventional panels formed of plywood or a single-ply veneer, it is to be understood that the various composite boards can be applied to thicker wood panels such as the various types of commercial lumber and the like.

While the foregoing presents preferred embodiments of the present invention, it is obvious that other modifications and/or equivalents may be employed without departing from the scope of the invention, which is defined in the appended claims.

What is claimed is:

1. An improved laminated panel comprising a wood base providing a major portion of the rigidity and structural strength of said panel, said wood base having opposed surfaces and a dimensionally stable composite board adhesively secured to at least one of said surfaces of said wood base, said composite board comprising a fiber board having an inner surface and an outer surface, said inner surface being adhesively secured to said wood base, said composite board consisting of at least one board filler element having incorporated therein a water repellant size to render said board filler element substantially water impervious, and a water, water vapor proof and relatively high heat resistant continuous barrier film autogenously adhered to and in direct contact with said outer surface of said fiber board and substantially uniformly distributed over said surface to effectively prevent diffusion of water and water vapor into said fiber board, said panel by reason of said water repellant size and said barrier film having low water vapor and water transmission characteristics whereby said panel is rendered substantially stable against warping from exposure to water and conditions of high relatively humidity, said dimensionally stable composite board being of a sufficient thickness to add considerable strength and rigidity to said laminated panel.

2. An improved panel as set forth in claim 1 wherein said barrier film comprises essentially polyethylene and said water repellant size substantially prohibits penetration of said barrier film into the fiber structure of said board filler elements.

3. An improved panel as set forth in claim 1 wherein said composite board is adhesively secured to said wood base by a second water and water vapor proof barrier film.

4. An improved panel as set forth in claim 1 wherein said fiber board comprises a plurality of board filler elements secured together by interposed layers of water insoluble adhesive.

5. An improved panel as set forth in claim 1 wherein said wood base comprises a plurality of plies of wood adhesively secured together.

6. An improved panel as set forth in claim 1 wherein a sheet of liner material is secured to said barrier film.

7. An improved laminated panel comprising a wood base providing a major portion of the rigidity and structural strength of said panel, said wood base having opposed surfaces, and a dimensionally stable composite board adhesively secured to at least one of said surfaces of said wood base, said composite board comprising a fiber board assembly having an inner surface and an outer surface, said inner surface being adhesively secured to said wood base, said composite board consisting of a plurality of laminae of board filler elements with a layer of water insoluble adhesive between adjacent laminae, each of said laminae having incorporated therein a water repellant size to render said laminae substantially water impervious and said water impervious laminae being joined into integral fiber board assembly by said water solube adhesive layer between said laminae, and a water, water vapor proof and relatively high heat resistant continuous barrier film of resinous material autogenously adhered to and in direct contact with said outer surface of said fiber board assembly and substantially uniformly distributed over said surface to effectively prevent diffusion of water and water vapor into said fiber board assembly, said barrier film composed essentially of polyethylene, said water repellant size substantially prohibiting penetration of said barrier film into the fiber structure of said board filler element, said panel by reason of said water repellant size, said water insoluble adhesive and said barrier film having low water vapor and water transmission characteristics whereby said panel is rendered substantially stable against warping from exposure to water in conditions of high relative humidity, said dimensionally stable composite board being of a sufficient thickness to add considerable strength and rigidity to said laminated panel.

8. An improved laminated panel comprising a wood base providing a major portion of the rigidity and structural strength of said panel, said wood base having opposed surfaces, and a dimensionally stable composite board adhesively secured to at least one of said surfaces of said wood base, said composite board comprising a fiber board assembly having opposed outer surfaces and consisting of a plurality of laminae of board filler elements with a layer of water insoluble adhesive between adjacent laminae, each of said laminae having incorporated therein a water repellant size to render said laminae substantially water impervious and said water impervious laminae being joined into integral fiber board assembly by said water insoluble adhesive layer between said laminae, and a water, water vapor proof and relatively high heat resistant continuous barrier film of resinous material autogenously adhered to and in direct contact with each of said outer surfaces of said fiber board assembly and substantially uniformly distributed over said surface to effectively prevent diffusion of water and water vapor into said fiber board assembly, said barrier film composed essentially of polyethylene, said water repellant size substantially prohibiting penetration of said barrier film into the fiber structure of said board filler element, said panel by reason of said water repellant size, said water insoluble adhesive and said barrier film having low water vapor and water transmission characteristics whereby said panel is rendered substantially stable against warping from exposure to water and conditions of high relatively humidity, said dimensionally stable composite board being of sufficient thickness to add considerable strength and rigidity to said laminated panel.

9. An improved laminated panel comprising a wood base providing a major portion of the rigidity and structural strength of said panel, said wood base having opposed surfaces, and a dimensionally stable composite board adhesively secured to at least one of said surfaces of said wood base, said composite board comprising a fiber board assembly having opposed outer surfaces and consisting of a plurality of laminae of board filler elements with a layer of water insoluble adhesive between adjacent laminae, each of said laminae having incorporated therein a water repellant size to render said laminae substantially water impervious and said water impervious laminae being joined into integral fiber board assembly by said water insoluble adhesive layer between said laminae, and a water, water vapor proof and relatively high heat resistant continuous barrier film of resinous material autogenously adhered to and in direct contact with each of said outer surfaces of said fiber board assembly and substantially uniformly distributed over said surfaces to effectively prevent diffusion of water and water vapor into said fiber board assembly, said barrier film composed essentially of polyethylene, said water repellant size substantially prohibiting penetration of said barrier film into the fiber structure of said board filler elements, and a sheet of paper liner material adhered to each of said barrier films, said panel by reason of said water repellant size, said water insoluble adhesive and said barrier film having low water vapor and water transmission characteristics whereby said panel is rendered substantially stable against warping from exposure to water and conditions of high relatively humidity, said dimensionally stable composite board being of a sufficient thickness to add considerable strength and rigidity to said laminated panel.

References Cited by the Examiner

UNITED STATES PATENTS

| | | | |
|---|---|---|---|
| 2,077,714 | 4/37 | Rozema | 154—132 |
| 2,154,143 | 4/39 | Whelan | 154—45.9 |
| 2,261,264 | 11/41 | Luty | 154—132 |
| 2,549,279 | 1/49 | Holden | 154—132 XR |
| 2,497,712 | 2/50 | Auchter | 154—132 |
| 2,565,251 | 8/51 | Malmstrom | 154—45.9 |
| 2,669,417 | 1/55 | Repsher et al. | 154—46 |
| 2,758,044 | 8/56 | Terry | 154—132 XR |
| 2,758,045 | 8/56 | Heaton et al. | |
| 2,774,698 | 12/56 | Jenk et al. | |

EARL M. BERGERT, *Primary Examiner.*

CARL F. KRAFFT, *Examiner.*